Dec. 21, 1937.　　　　S. T. WILLIAMS　　　　2,102,774

COUPLING

Filed Jan. 3, 1936

INVENTOR
Selden T. Williams
BY
Fraser, Myers & Manley
ATTORNEYS.

Patented Dec. 21, 1937

2,102,774

UNITED STATES PATENT OFFICE 2,102,774

COUPLING

Selden T. Williams, Bellerose, N. Y., assignor to Scovill Manufacturing Company, Waterbury, Conn., a corporation of Connecticut Application January 3, 1936, Serial No. 57,350

2 Claims. (Cl. 285—173)

My present invention relates to couplings and aims to provide certain improvements therein. More particularly the invention relates to airline hose couplings of the type wherein one of the coupling members is adapted to be quickly coupled to the other member by being inserted into said other member.

According to my present invention the coupling members are so constructed that the coupling of the members together operates to provide a fluid-tight joint between the coupled members, and also, if desired, can be made to provide a swivel connection between the coupled members. Also, if desired, a valve may be carried by one of the members, which valve is adapted to be automatically opened in the act of coupling the members together. Moreover, the coupling members are so coordinated that the coupling and uncoupling operation can be quickly and easily accomplished by a slight rotation of one of the members, which, nevertheless, are securely held in coupled relation against accidental uncoupling.

The invention will be better understood from the detailed description which follows, when considered in conjunction with the accompanying drawing showing two preferred embodiments of my invention, and wherein:—

Figure 1:
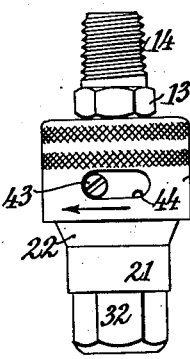
Figure 1 is an elevation of an airline hose coupling embodying my invention.

Referring first to Figs 1, 2, 4, 7 and 8, of the drawing, the hose coupling may be said to consist of two principal parts, viz., a tubular plug or entering member 10 and a socket or entered member 11 having a check valve 12 therein.

The plug or entering member consists of a tubular element, which, intermediate its ends, is formed as a polygonal wrench-engaging portion 13, from one end of which extends a tapered externally screw-threaded portion 14 for engagement with a hose fitting or the like, and from the other end of which extends a portion having a cylindrical section 15 formed with an annular groove 16 therein and a tapered or conical section 17 which terminates in a cylindrical end section 18. Of course, the specific construction and contour of this plug member may be varied, depending upon the specific construction of the socket or entered member with which said plug is to cooperate.

Figure 2:
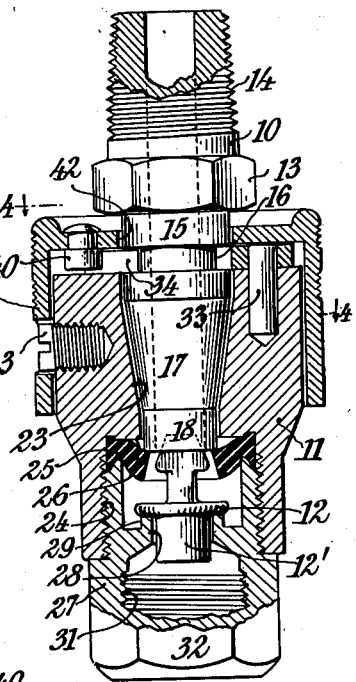
Fig. 2 is a longitudinal section of the coupling shown in Fig. 1, with parts thereof shown in elevation, said section being taken substantially along the plane of the broken line 2—2 of Fig. 4.
Figure 7:
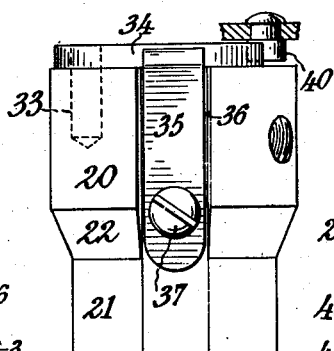
Fig. 7 is an elevation of the socket member of the hose coupling shown in Fig. 2.

The socket member 11 may be said to comprise a tubular body portion having cylindrical sections 20 and 21, the former being of somewhat larger diameter than the latter, which sections are connected by a conical shoulder 22. The bore through the body portion has various diameters, the upper portion of said bore or that within the larger diameter section of the body being formed as a conical and cylindrical socket 23 of substantially complemental form to that of the entering end 17, 18, of the plug member. The bore through the section 21 is of larger internal diameter than the socket 23 and is internally screw-threaded, as indicated at 24, there being a flat shoulder 25 formed at the juncture of the bores 23 and 24. Seated against the shoulder 25 is a compressible packing washer 26, formed of rubber or the like, which is peripherally held against said shoulder by the inner end of a tubular plug 27 which screw-threadedly engages within the threaded bore 24 of the socket member. The peripherally held packing washer 26 is adapted for central flexing, as shown in Fig. 2, and the function therefor will presently appear. The plug 27 intermediate its ends is formed with a constricted bore 28 from which extends an axial reentrant lip 29 adapted to provide a support for the valve 12 when in unseated relation. The bore 28 is of slightly larger diameter than a guiding system 12' on the valve, and to provide for the free passage of fluid through the bore 28, it may be cut through at diametrically opposite points, as best shown at 30 in Fig. 6. The bore of the plug 27 below the constricted portion thereof is preferably enlarged and internally screw-threaded, as indicated at 31, for accommodating a screw-threaded fitting on the end of a hose (not shown). To insure a proper leak-tight engagement between the plug 27 and the packing 26, as well as to afford proper coupling engagement between the plug 27 and the hose which may be connected thereto, the external surface of the plug may be formed with wrench-engaging surfaces 32.

Mounted in the plug entering end-face of the socket member 11 preferably at diametrically opposite points, are a pair of pins 33 upon which are pivotally mounted a pair of flat pawls 34 of substantially arcuate form. These pawls are of a thickness or height to engage within the annular groove 16 in the plug member 10 when the latter is inserted into the socket member. To cause such engagement of the pawls within the annular groove, the pawls are subjected to the action of flat leaf springs 35, each of which is mounted in an axially-extending recess 36 cut into the outer surface of the socket member and held therein by a screw or the like 37. To cause disengagement of the pawls from the groove there are provided a pair of studs 40 mounted at diametrically opposite points in the top of a cap sleeve 41, the top of which is formed with a central circular opening 42 through which the entering end of the plug 10 can pass and within which the cylindrical portion 15 of the plug will seat to provide a swivel connection between the plug and the socket member when assembled. The sleeve 41 is mounted on the socket member 11 so as to be capable of limited rotative movement relative thereto and is held in such assembled relation by means of screws 43 which extend through elongated slots 44. Preferably the heads of the screws 43 are set to extend within the contour of the sleeve 41 so as not to provide objectionable protrusions when handling the coupling. The relation of the studs 40 to the ends of the pawls 34 is preferably such that said studs will normally limit the inward movement of the pawls so as not to obstruct the bore in the socket member and thus prevent entrance of the plug member thereinto; also such as will, upon rotation of the sleeve 41 relatively to the socket member, engage the ends of the pawls to cam or move them outwardly to disengage the groove 16. For facilitating the gripping of the sleeve 41 for rotating the same, it may be provided with knurling 44'.

The valve 12 within the socket member comprises a disk-like portion adapted to seat against the packing 26 to provide a closure for the bore through the socket member and has axially-extending from one face of said disk the guiding stem 12' and has extending from the opposite face of the disk a pin, the free end of which has a substantially conical head 12" which has portions thereof cut away at diametrically opposite sides to provide for the flow of fluid thereover when said head is engaged by the entering end of the plug 10.

Figure 3:
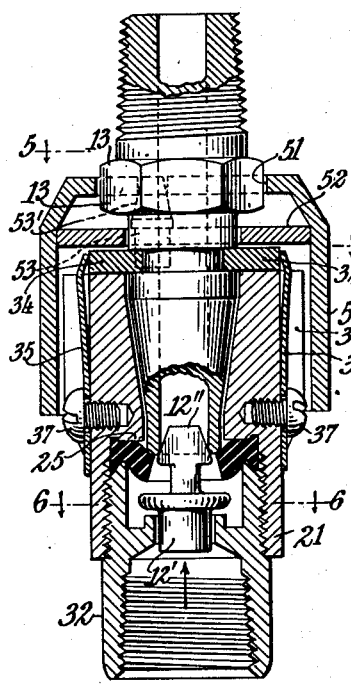
Fig. 3 is a longitudinal section of a slightly modified form of the invention with parts thereof shown in elevation, said section being taken substantially alone the plane of the line 3—3 of Fig. 5.
Figure 5:
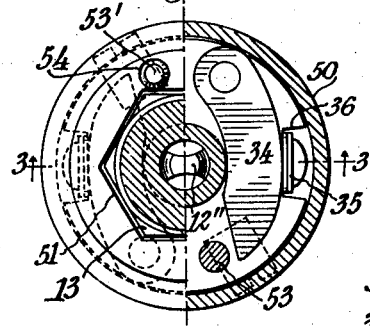
Fig. 5 is a section taken substantially along the planes of the broken line 5—5 of Fig. 3.
Figure 4:
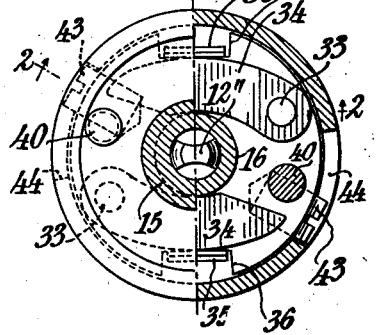
Fig. 4 is a section taken substantially along the planes of the broken line 4—4 of Fig. 2.
Figure 6:
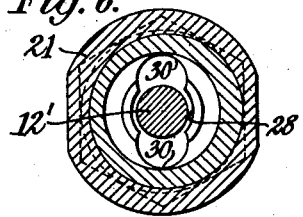
Fig. 6 is a section taken substantially along the plane of the line 6—6 of Fig. 3.

In Figs. 3, 5, and 6, the constructions of the plug 10 and the socket member 11 are the same as that hereinbefore described. The construction shown in these figures primarily differs from that previously described in that a non-swivel connection is provided between the coupling elements when coupled together. Under certain conditions of use such non-swivel engagement is more advantageous than the swivel type connection. Accordingly, the construction disclosed in these figures primarily differs from that previously described in that the sleeve 50 which is mounted on the socket member for limited relative rotation is of somewhat greater length than the sleeve 41, and at its top is formed as an axial polygonal opening 51 of complemental shape to the hexagonal wrench-engaging portion 13 of the plug 10, and the parts are so proportioned that when the plug 10 is inserted into the socket member the portion 13 of the plug will engage within the polygonal recess 51 of the sleeve. Mounted within the sleeve 50 is a plate 52 which carries a pair of studs 53 in substantially the same relation to the plug entering end-face of the socket member as the studs 40 bear, and intended for the same purpose. These studs 53 have conical heads 53', the bases of which seat upon one face of the plate 52 and the tops of which engage in holes 54 in the top of the sleeve 50. In view of this arrangement it will be apparent that upon rotation of the sleeve 50 the studs 53 will move therewith as a unit and thus function in the same manner as do the studs 40 previously described.

Figure 8:
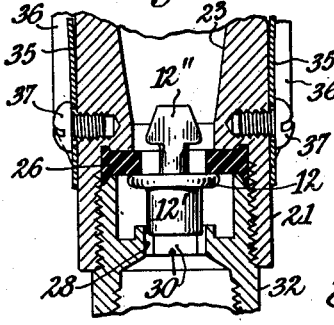
Fig. 8 is a fractional longitudinal section of the socket member shown in Fig. 7.

In use, the coupling of the present invention has its plug member carried by one end of a hose which is secured by a suitable fitting to the screw-threaded portion 14 and the socket member 11 is carried by one end of a hose which is secured thereto by a suitable fitting engaging the screw-threaded portion 31. As will be obvious, the hose line connected to the socket member will lead to the source of compressed air, in view of which the valve 12 will be seated by the air pressure, as shown in Fig. 8. To couple the hose line carrying the plug 10 to the socket member it is merely necessary to insert the entering end of the plug through the opening in the top of the sleeve 41 or 50, whereupon the tapered portion 17 of the plug will move the pawls outwardly until the groove 16 is presented in the plane of the pawls, at which time the pawls will snap into the groove. Substantially simultaneously with this action the entering end of the plug will receive or engage over the tapered head 12" of the valve to move it away from its seat and will also engage the seat packing 26 to provide a fluid-tight engagement therewith. Air or other fluid under pressure will then pass around the valve 12 through the plug 10 into the hose connected therewith. It will be apparent that the connection between the coupling members 10 and 11 in Figs. 1, 2, 4 and 8, will provide a swivel connection in view of the engagement of the pawls 34 in the groove 16 and the cylindrical portion 15 in the opening 42. In Figs. 3, 5 and 6, however, although the pawls 34 engage within the groove 16 of the plug member, it will be observed that the polygonal portion 13 on the plug is in complemental engagement with the opening 51 in the sleeve 50 whereby a swivel connection between said parts is precluded although limited relative rotation between the sleeve 50 and the socket member 11 is permitted. To uncouple the members a rotation of either of the sleeves 41 or 50 relative to the socket member 11 through a relatively small angle, will operate to move the studs 40 or 53 into camming engagement with the pawls 34 to move them outwardly out of the groove 16, whereupon the plug member may be readily withdrawn from the socket member. Obviously as soon as this plug member is withdrawn, the fluid pressure acting upon the valve 12 will immediately seat the same.

From the foregoing detailed description it will be apparent that I have provided an airline hose coupling of relatively simple construction which provides for facile coupling and uncoupling of hose lines and which can be quickly manipulated by the hands of an operator without any supplemental tools or devices. It will be appreciated that the couplings herein disclosed are susceptible of modification in construction within the range of engineering skill without departing from the spirit of the invention, and hence I do not wish to be limited to the details of construction disclosed except in so far as they fall within the scope of the appended claims.

What I claim is:

1. A hose coupling comprising a socket member, a plug member for engaging in said socket member, one of said members having a packing therein adapted to be engaged by the other member when said members are brought into coupling relation, a spring-pressed pawl carried by one of the members, and the other member having a groove for receiving said pawl to hold the members in coupled relation, a sleeve carried by and capable of limited rotative movement relatively to the socket member and means carried by said sleeve for engaging said pawl for moving it outwardly to disengage it from its receiving groove, the sleeve and the plug member having complemental engaging parts extending axially thereof for holding said sleeve and said plug member against relative rotation upon the coupling members being coupled together.

2. A hose coupling comprising a socket member and a plug member for engaging in said socket member, the plug member having an annular groove therein, the socket member having a pivotally mounted pawl at one end thereof for engaging in said groove, spring means for urging the pawl radially inwardly, a sleeve carried by and capable of limited rotative movement relatively to the socket member enclosing the pawl and the spring, and an axially-projecting pin carried by the sleeve normally acting directly upon the pawl to limit the radial inward movement thereof and adapted for moving said pawl outwardly against the tension of the spring means upon limited rotation of the sleeve relatively to the socket member.

SELDEN T. WILLIAMS.